(12) United States Patent  
Binek et al.

(10) Patent No.: US 11,542,844 B2
(45) Date of Patent: Jan. 3, 2023

(54) INTEGRATED LUBRICATING FLUID FILTERING AND METERING DEVICE

(71) Applicant: Raytheon Technologies Corporation, Farmington, CT (US)

(72) Inventors: Lawrence A. Binek, Glastonbury, CT (US); Sean R. Jackson, Palm City, FL (US); Evan J. Butcher, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 148 days.

(21) Appl. No.: 16/577,526

(22) Filed: Sep. 20, 2019

(65) Prior Publication Data

US 2021/0087955 A1   Mar. 25, 2021

(51) Int. Cl.
| | |
|---|---|
| *F01M 1/16* | (2006.01) |
| *B33Y 80/00* | (2015.01) |
| *F01D 25/18* | (2006.01) |
| *F01M 9/04* | (2006.01) |
| *F01M 11/02* | (2006.01) |
| *F01M 11/03* | (2006.01) |

(52) U.S. Cl.
CPC ............... *F01M 1/16* (2013.01); *B33Y 80/00* (2014.12); *F01D 25/18* (2013.01); *F01M 9/04* (2013.01); *F01M 11/02* (2013.01); *F01M 11/03* (2013.01); *F05D 2220/32* (2013.01); *F05D 2260/98* (2013.01)

(58) Field of Classification Search
CPC . F01M 1/16; F01M 9/04; F01M 11/02; F01M 11/03; B33Y 80/00; F01D 25/18; F01D 25/16; F01D 25/12; F01D 25/22; F05D 2220/32; F05D 2260/98; F05D 2230/53; F05D 2260/607; F05D 2250/21; F05D 2250/28; F05D 2230/31; F02C 7/06
USPC .................................................. 210/167.02
See application file for complete search history.

(56) References Cited

U.S. PATENT DOCUMENTS

| | | | |
|---|---|---|---|
| 3,692,041 | A | 9/1972 | Bondi |
| 7,172,694 | B2 | 2/2007 | Bortnik |
| 10,174,621 | B2 | 1/2019 | Burd |
| 10,221,694 | B2 | 3/2019 | Snyder |

(Continued)

FOREIGN PATENT DOCUMENTS

| | | | |
|---|---|---|---|
| CN | 105033188 A | * | 11/2015 |
| EP | 1803897 A2 | | 7/2007 |

(Continued)

OTHER PUBLICATIONS

Extended European Search Report for EP Application No. 20196960.7, dated Jan. 13, 2021, pp. 8.

*Primary Examiner* — Yi-Kai Wang
(74) *Attorney, Agent, or Firm* — Getz Balich LLC

(57) ABSTRACT

A lubrication system for an attritable engine includes a bearing chamber, a fluid filtering inlet configured to receive a fluid, and a fluid filtering outlet located downstream of the fluid filtering inlet and configured to deliver the fluid to the bearing chamber. The lubrication system also includes a lattice, integral and conformal with the attritable engine, configured to filter the fluid, and located between the fluid filtering inlet and the fluid filtering outlet. The lubrication system also includes a metering port, configured to meter the fluid and located downstream of the lattice and upstream of the fluid filtering outlet.

20 Claims, 3 Drawing Sheets

(56) References Cited

U.S. PATENT DOCUMENTS

| | | | |
|---|---|---|---|
| 2008/0127627 A1* | 6/2008 | Jewess | F01D 25/20 60/39.08 |
| 2011/0137333 A1* | 6/2011 | Hendrickson | A61F 2/01 606/200 |
| 2015/0337695 A1* | 11/2015 | Ardes | B01D 35/153 210/232 |
| 2016/0032772 A1* | 2/2016 | Sheridan | F01D 15/12 416/171 |
| 2017/0002791 A1* | 1/2017 | Yarbrough | B32B 7/02 |
| 2018/0058771 A1 | 3/2018 | Butcher et al. | |
| 2018/0142746 A1* | 5/2018 | Hodgkins | F16D 55/22 |
| 2018/0347442 A1 | 12/2018 | Lacy et al. | |
| 2019/0249558 A1 | 8/2019 | Zaccardi et al. | |
| 2020/0306674 A1* | 10/2020 | Ota | B01D 39/12 |

FOREIGN PATENT DOCUMENTS

| | | |
|---|---|---|
| KR | 20110091387 A | 8/2011 |
| WO | WO2014133836 A1 | 9/2014 |

* cited by examiner

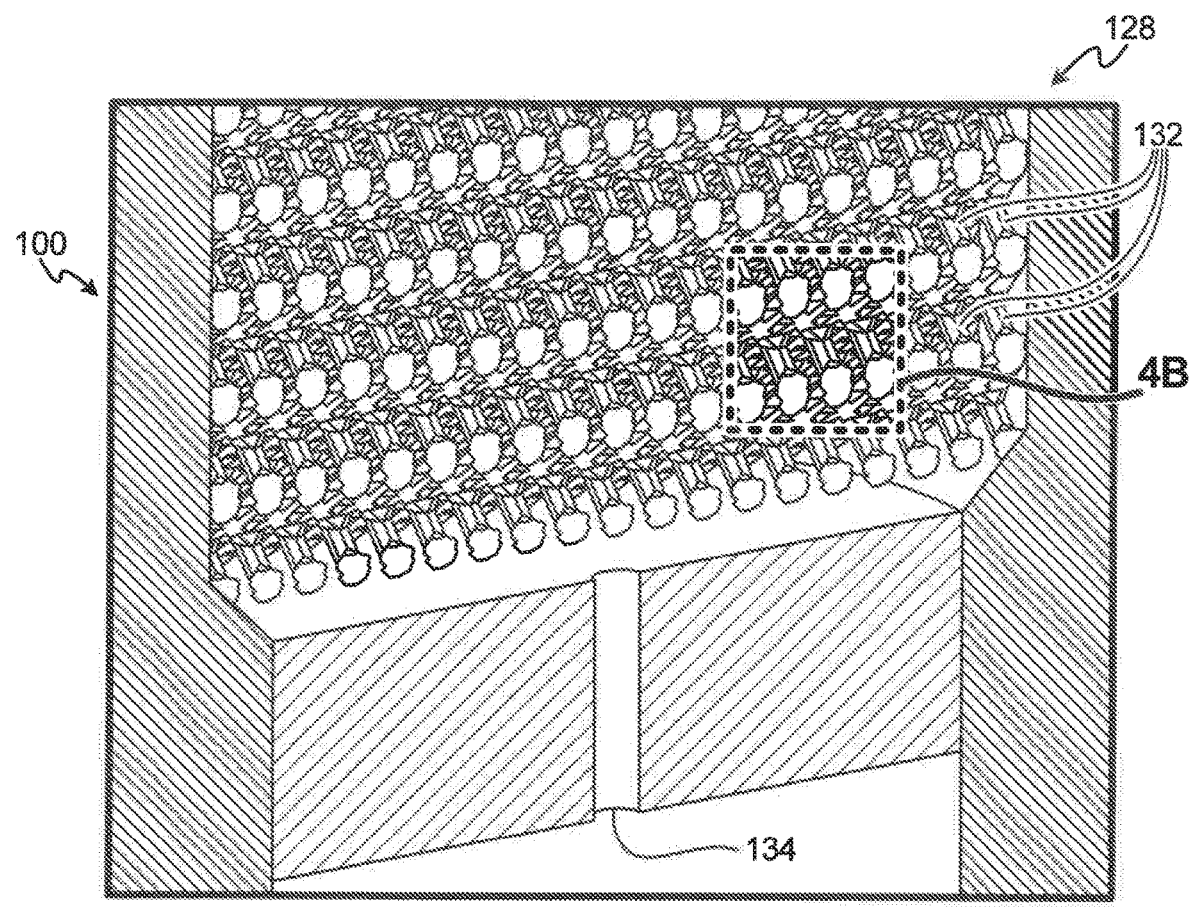
Fig. 4A
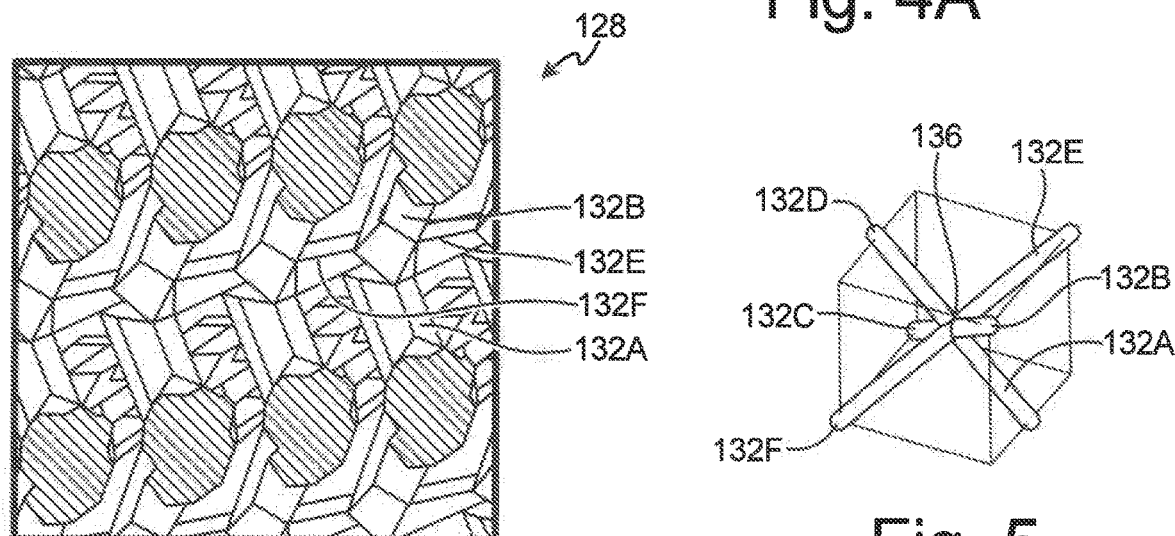
Fig. 4B
Fig. 5

INTEGRATED LUBRICATING FLUID FILTERING AND METERING DEVICE

BACKGROUND

The present disclosure relates generally to attritable aircraft engines. More specifically, this disclosure relates to a fluid dispensing system within an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary, such as, a fluid dispensing system within a traditional aircraft engine. The fluid dispensing system can have 5 or more individual parts, each requiring assembly, which can be expensive and time consuming.

Filters are an important part of the lubrication system because they remove foreign particles that may be in the lubricating fluid. This is particularly important in gas turbines as very high engine speeds are attained; the antifriction types of ball and roller bearings would become damaged quite rapidly if lubricated with contaminated fluids. Also, there are usually numerous drilled or core passages leading to various points of lubrication. Since these passages are usually rather small, they are easily clogged.

Additionally, metering the lubrication fluid is important. On the one hand, enough lubrication fluid needs to be provided such that sufficient cooling of the bearings are achieved under all working conditions of the gas turbine engine. On the other hand, too much lubrication fluid may require larger fluid pumps and piping system than necessary, increasing the footprint of the lubrication system. Also, pumping unnecessary lubrication fluid through the system uses energy that could be used elsewhere in the gas turbine engine. As such, providing too much lubrication fluid results in a less efficient gas turbine engine compared to a gas turbine engine provided with a proper amount of lubrication fluid.

SUMMARY

A lubrication system for an attritable engine includes a bearing chamber, a fluid filtering inlet configured to receive a fluid, and a fluid filtering outlet located downstream of the fluid filtering inlet and configured to deliver the fluid to the bearing chamber. The lubrication system also includes a lattice, integral and conformal with the attritable engine, configured to filter the fluid, and located between the fluid filtering inlet and the fluid filtering outlet. The lubrication system also includes a metering port, configured to meter the fluid and located downstream of the lattice and upstream of the fluid filtering outlet.

A method of manufacturing an attritable engine lubrication system includes manufacturing a bearing chamber, a fluid filtering inlet configured to receive a fluid, and a fluid filtering outlet located downstream of the fluid filtering inlet and configured to deliver the fluid to the bearing chamber. The method also includes manufacturing a lattice, integral and conformal with the attritable engine, configured to filter the fluid, and located between the fluid filtering inlet and the fluid filtering outlet. The method also includes manufacturing a metering port, configured to meter the fluid, and located downstream of the lattice and upstream of the fluid filtering outlet.

BRIEF DESCRIPTION OF THE DRAWINGS

FIG. 4A is a regional sectional view from the attritable engine in FIG. 3.

FIG. 4B is a regional sectional view from the lattice in FIG. 4A.

FIG. 5 is a perspective view of another embodiment of a repeating lattice structure.

DETAILED DESCRIPTION

An attritable engine with an integrally built fluid dispensing system simplifies manufacturing. Even so, an attritable engine can leverage additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

Disclosed herein is a lubrication system having an integrated lattice network of spars placed in a lubrication flow pathway. The lattice filters a fluid in a gas turbine engine and the fluid is metered by a metering port located downstream of the lattice. The lattice can be built using additive manufacturing techniques such as, for example, laser powder bed fusion, electron beam melting, and glue binder jetting.

Figure 1:
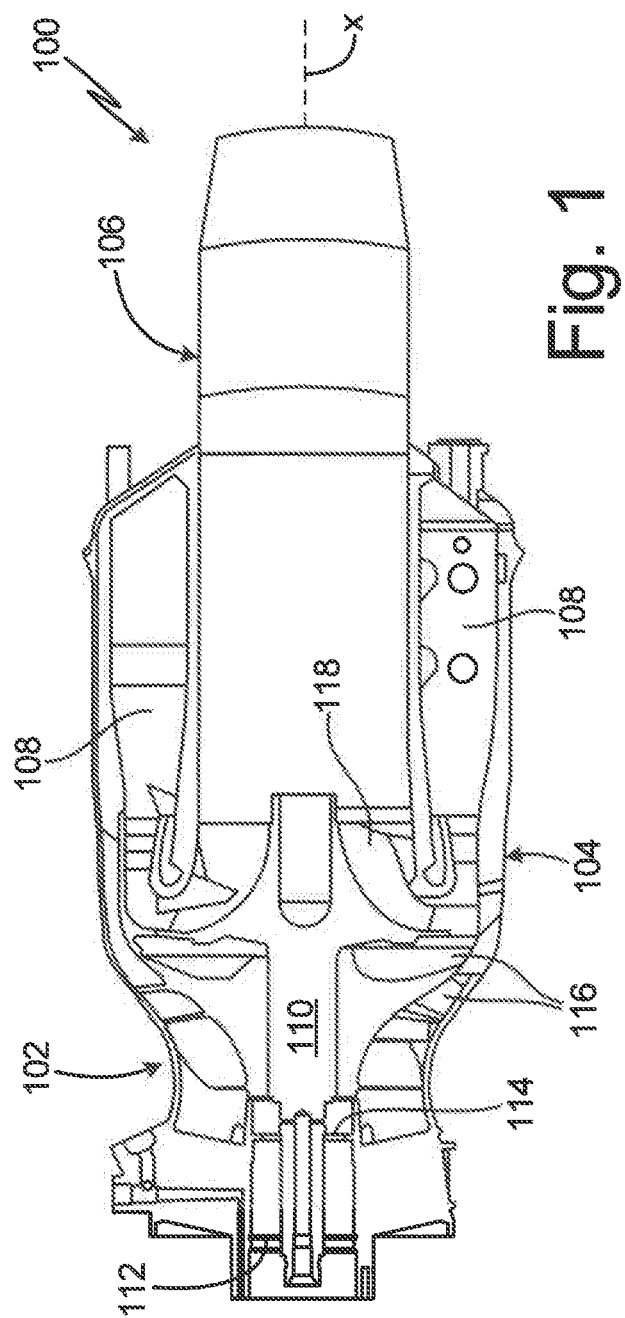
FIG. 1 is a cross-sectional view of an attritable engine.

FIG. 1 is a cross-sectional view of an attritable engine. FIG. 1 shows attritable engine 100 including compressor section 102, turbine section 104, exhaust section 106, combustor 108, rotor 110, bearings 112 and 114, compressor blades 116, turbine blades 118, and axis of rotation X. In the illustrated embodiment, attritable engine 100 shows compressor section 102 lying forward and adjacent to turbine section 104, which is positioned forward of exhaust section 106. Although combustor 108 lies physically aft of turbine section 104, combustor 108 fluidically sits between compressor section 102 and turbine section 104. This arrangement may be referred to as a reverse flow combustor. Rotor 110 extends along the axis of rotation X into both compressor section 102 and turbine section 104. Rotor 110 is received in bearings 112 and 114. Attached to rotor 110 are compressor blades 116 and turbine blades 118.

Operationally, air enters the forward end of compressor section 102 and is compressed by compressor blades 116. Compressed air along with fuel enters combustor 108 where the compressed air and fuel are combusted. The combusted fuel and compressed air from combustor 108 enters turbine section 104 and turns turbine blades 118 circumferentially around rotational axis X, which generates power by also turning rotor 110. The air exits out of the aft end of exhaust section 106.

Figure 2:
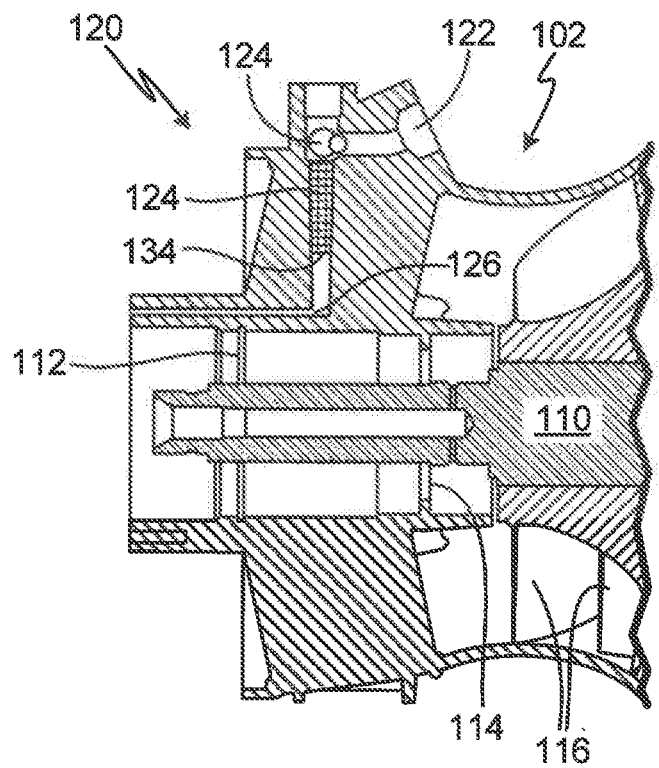
FIG. 2 is a regional sectional view from the attritable engine in FIG. 1.
Figure 3:
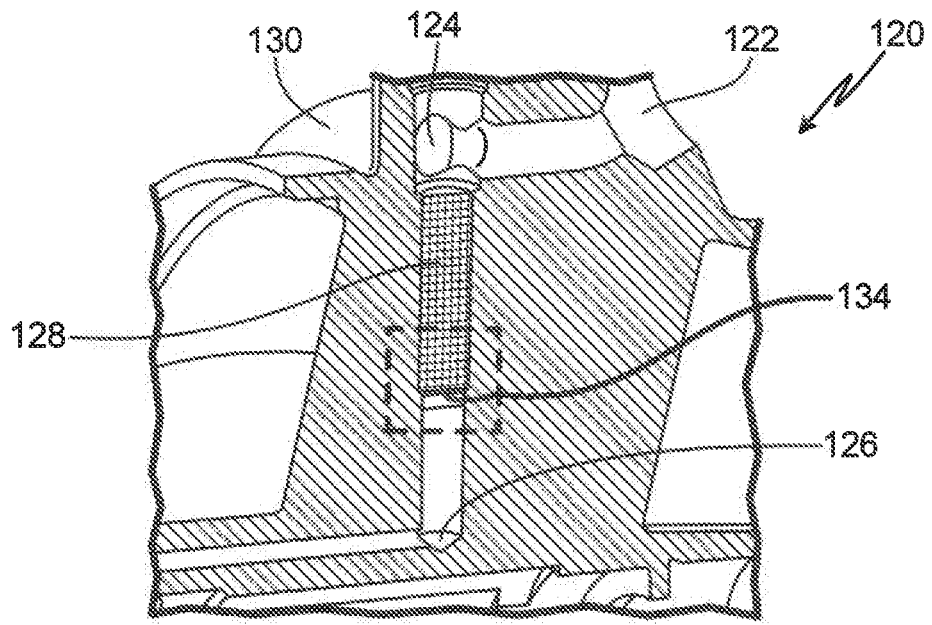
FIG. 3 is another cross-sectional view of the attritable engine including a metering device integrated into the fuel path.

FIGS. 2 and 3 will be discussed together. FIG. 2 is a regional sectional view from attritable engine 100 in FIG. 1. FIG. 2 shows attritable engine 100 including compressor section 102, rotor 110, bearings 112 and 114, compressor blades 116, lubrication system 120, fluid manifold 122, fluid filtering inlet 124, fluid filtering outlet 126, lattice 128 and metering port 134. FIG. 3 is another cross-sectional view of the attritable engine including a metering device integrated into the fuel path. FIG. 3 shows attritable engine 100 including lubrication system 120, fluid manifold 122, fluid filtering inlet 124, fluid filtering outlet 126, lattice 128, metering port 134, and fluid distribution rail 130.

Lubrication system 120 provides fluid to bearings 112 and 114 from a fluid source such as, for example, a fuel tank or an oil tank. Fluid can be any fluid that provides cooling to bearings 112 and 114 such as, for example, fuel and oil. Fluid enters lubrication system 120 from a fluid source at fluid manifold 122, which distributes fluid to fluid filtering inlet 124. Fluid manifold 122 can distribute fluid to more than one fluid filtering inlet 124 through fluid distribution rail 130, shown in FIG. 3. Fluid distribution rail 130 circumferentially travels around the engine casing. Fluid distribution rail 130 may travel all the way around the engine casing or only partially around the engine casing and distribute fluid to multiple fluid filtering inlets 124.

Fluid exits lubrication system 120 at fluid filtering outlet 126 and is then distributed to components within attritable engine 100 in need of lubrication such as bearings 112 and 114. Lattice 128 is located between fluid filtering inlet 124 and fluid filtering outlet 126. Lattice 128 is formed of a repeating pattern of spars that filters the fluid. Metering port 134 meters the fluid flow rate through fluid distribution system 120 and is located downstream of lattice 128 and upstream of fluid filtering outlet 126. Fluid distribution system 120 can be formed of stainless steel. In other embodiments, fluid distribution system 120 can be formed of aluminum, titanium, copper, cobalt, iron, nickel, and alloys thereof.

FIG. 4A is a regional sectional view from the attritable engine in FIG. 3. FIG. 4A shows lattice 128 of attritable engine 100 including spars 132, and metering port 134. Lattice 128 is formed of multiple spars 132, which are arranged to filter a fluid passing through lattice 128. In other words, particulates present in the fluid which are larger than the passages formed by the arrangement of spars 132 are selectively filtered out of the fluid. Spars can be sized and oriented based on various factors such as filtering out particulates of a certain size present in the fluid and manufacturing considerations (some spars 132 sizes and orientations may be easier to manufacture than others). Metering port 134 is adjacent to and downstream of spars 132. Metering port 134 can be sized to meter the flow rate of the fluid within a target range through fluid distribution system 120.

FIG. 4B is a regional sectional view from the lattice in FIG. 4A. FIG. 4B shows lattice 128 of attritable engine 100 including spars 132A, 132B, 132E, and 132F. Spars 132C and 132D is obscured by the other spars in FIG. 4B and, as such, not shown in FIG. 4B. In the illustrated embodiment, there are six spars 132 radially extending from a center point at substantially 90° angles to one another, forming a spar assembly. Multiple spar assemblies are formed adjacent one another and together form lattice 128.

FIG. 5 is a perspective view of another embodiment of the repeating lattice structure. FIG. 5 shows spar assembly 138 including spars 132A, 132B, 132C, 132D, 132E, and 132F, and center point 136. In the illustrated embodiment, there are six spars 132 radially extending from a center point 136. Adjacent spars 132, for example spars 132A and 132B, lie at substantially 90° angles to one another. The ends of any three adjacent spars 132, for example spars 132A, 132B, and 132E, which are at an opposing end to center point 136, can form an abstract triangle. Taking all eight sets of three adjacent spars 132 and the resulting abstract triangle from each set of three adjacent spars 132 forms an abstract 3-dimensional shape, which can referred to as a square bipyramid.

Each spar 132 can have, for example, a diameter of 0.01 inches (0.25 mm). In other embodiments, each spar 132 can have a diameter from 0.005 inches (0.13 mm) to 0.02 inches (0.51 mm), inclusive. In other embodiments, each spar 132 can have a diameter smaller than 0.005 inches (0.13 mm). In other embodiments, each spar 132 can have a diameter larger than 0.02 inches (0.51 mm). Each spar 132 can have a length of 0.05 inches (1.3 mm). In other embodiments, each spar 132 can have a length from 0.03 inches (0.76 mm) to 0.1 inches (2.5 mm), inclusive. In other embodiments, each spar 132 can have a length smaller than 0.03 inches (0.76 mm). In other embodiments, each spar 132 can have a length larger than 0.1 inches (2.5 mm).

In other embodiments, spar assembly 138 includes more than six spars 132. In other embodiments, spar assembly 138 includes fewer than six spars 132. In other embodiments, two adjacent spars 132 can lie at an angle more than 90° from one another. In other embodiments, two adjacent spars 132 can lie at an angle from 45° to 90° from one another.

Lattice 128 is integral and conformal with attritable engine 100 and can be manufactured using additive manufacturing techniques such as laser powder bed fusion, electron beam melting, and glue binder jetting.

A fluid dispensing system having an integrated lattice network of spars placed in a lubrication flow pathway unitizes and, simultaneously permits integration of many complex performance-enhancing features. Specifically, the lattice can filter a fluid used to cool the bearings in a gas turbine engine while a metering port can control the flow rate of the fluid through the fluid dispensing system.

DISCUSSION OF POSSIBLE EMBODIMENTS

The following are non-exclusive descriptions of possible embodiments of the present invention.

A lubrication system for an attritable engine includes a bearing chamber, a fluid filtering inlet configured to receive a fluid, and a fluid filtering outlet located downstream of the fluid filtering inlet and configured to deliver the fluid to the bearing chamber. The lubrication system also includes a lattice, integral and conformal with the attritable engine, configured to filter the fluid, and located between the fluid filtering inlet and the fluid filtering outlet. The lubrication system also includes a metering port, configured to meter the fluid and located downstream of the lattice and upstream of the fluid filtering outlet.

The system of the preceding paragraph can optionally include, additionally and/or alternatively any one or more of the following features, configurations or additional components:

The lattice is formed of a repeated pattern of spar assemblies.

Each spar assembly includes six spars.

The spar assembly has a square bipyramid shape.

The spars have a diameter from 0.005 inches (0.13 mm) to 0.02 inches (0.51 mm), inclusive.

The spars have a length from 0.03 inches (0.76 mm) to 0.1 inches (2.5 mm), inclusive.

The fluid filtering inlet, the fluid filtering outlet, the metering port, and the lattice are formed from a member of the group selected from aluminum, titanium, copper, cobalt, iron, nickel, nickel alloys, stainless steel, and combinations thereof.

The fluid is fuel for a gas turbine engine.

The lattice is built in a layer by layer process using additive manufacturing techniques.

A method of manufacturing an attritable engine lubrication system includes manufacturing a bearing chamber, a fluid filtering inlet configured to receive a fluid, and a fluid filtering outlet located downstream of the fluid filtering inlet and configured to deliver the fluid to the bearing chamber. The method also includes manufacturing a lattice, integral and conformal with the attritable engine, configured to filter the fluid, and located between the fluid filtering inlet and the fluid filtering outlet. The method also includes manufacturing a metering port, configured to meter the fluid, and located downstream of the lattice and upstream of the fluid filtering outlet.

The method of the preceding paragraph can optionally include, additionally and/or alternatively any, one or more of the following features, configurations and/or additional components:

The lattice is formed of a repeated pattern of spar assemblies.

Each spar assembly includes six spars.

The spar assembly has a square bipyramid shape.

The spars have a diameter from 0.005 inches (0.13 mm) to 0.02 inches (0.51 mm), inclusive.

The spars have a length from 0.03 inches (0.76 mm) to 0.1 inches (2.5 mm), inclusive.

The fluid filtering inlet, the fluid filtering outlet, the metering port, and the lattice are formed from a member of the group selected from aluminum, titanium, copper, cobalt, iron, nickel, nickel alloys, stainless steel, and combinations thereof.

The fluid is fuel for a gas turbine engine.

The lattice is built in a layer by layer process using additive manufacturing techniques.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lubrication system for an attritable engine, the lubrication system comprising:
    a bearing chamber;
    a fluid filtering inlet configured to receive a fluid;
    a fluid filtering outlet located downstream of the fluid filtering inlet and configured to deliver the fluid to the bearing chamber;
    a lattice, integral and conformal with the attritable engine, configured to filter the fluid, and located between the fluid filtering inlet and the fluid filtering outlet, wherein the lattice is formed of a repeated pattern of multiple spar assemblies formed adjacent one another, wherein each of the multiple spar assemblies comprises a plurality of spars that are sized and oriented to filter particulates in the fluid, and wherein a first of the multiple spar assemblies comprises six of the plurality of spars extending radially out from a center point; and
    a metering port configured to meter the fluid, the metering port located adjacent and downstream of the lattice and located upstream of and spaced from the fluid filtering outlet.

2. The system of claim 1, wherein the first of the multiple spar assemblies has a square bipyramid shape.

3. The system of claim 1, wherein the spars have a diameter from 0.005 inches (0.13 mm) to 0.02 inches (0.51 mm), inclusive.

4. The system of claim 1, wherein the spars have a length from 0.03 inches (0.76 mm) to 0.1 inches (2.5 mm), inclusive.

5. The system of claim 1, wherein the fluid filtering inlet, the fluid filtering outlet, the metering port, and the lattice are formed from a member of the group selected from aluminum, titanium, copper, cobalt, iron, nickel, nickel alloys, stainless steel, and combinations thereof.

6. The system of claim 1, wherein the fluid is fuel for a gas turbine engine.

7. The system of claim 1, wherein the lattice is built in a layer by layer process using additive manufacturing techniques.

8. A method of manufacturing an attritable engine lubrication system, the method comprising:
    manufacturing a bearing chamber, a fluid filtering inlet configured to receive a fluid, and a fluid filtering outlet located downstream of the fluid filtering inlet and configured to deliver the fluid to the bearing chamber;
    manufacturing a lattice, integral and conformal with the attritable engine, configured to filter the fluid, and located between the fluid filtering inlet and the fluid filtering outlet, wherein the lattice is formed of a repeated pattern of multiple spar assemblies formed adjacent one another, wherein each of the multiple spar assemblies comprises a plurality of spars that are sized and oriented to filter particulates in the fluid, and wherein a first of the multiple spar assemblies comprises six of the plurality of spars extending radially out from a center point; and
    manufacturing a metering port configured to meter the fluid, the metering port located adjacent and downstream of the lattice and located upstream of and spaced from the fluid filtering outlet.

9. The method of claim 8, wherein the first of the multiple spar assemblies has a square bipyramid shape.

10. The method of claim 8, wherein the spars have a diameter from 0.005 inches (0.13 mm) to 0.02 inches (0.51 mm), inclusive.

11. The method of claim 8, wherein the spars have a length from 0.03 inches (0.76 mm) to 0.1 inches (2.5 mm), inclusive.

12. The method of claim 8, wherein the fluid filtering inlet, the fluid filtering outlet, and the lattice are formed from a member of the group selected from aluminum, titanium, copper, cobalt, iron, nickel, nickel alloys, stainless steel, and combinations thereof.

13. The method of claim 8, wherein the fluid is fuel for a gas turbine engine.

14. The method of claim 8, wherein manufacturing the fuel lattice is performed using additive manufacturing techniques.

15. The method of claim 8, wherein
    the six of the plurality of spars comprise a first spar, a second spar and a third spar;

the second spar is angularly offset from the first spar at the center point; and the third spar is angularly offset from the first spar and the second spar at the center point.

16. The method of claim 8, wherein the six of the plurality of spars comprise a first spar, a second spar and a third spar;

the first spar and the second spar lie along a reference plane; and the third spar is angularly offset from the reference plane.

17. The lubrication system of claim 1, wherein the six of the plurality of spars comprise a first spar, a second spar and a third spar;

the second spar is angularly offset from the first spar at the center point; and the third spar is angularly offset from the first spar and the second spar at the center point.

18. The lubrication system of claim 1, wherein the six of the plurality of spars comprise a first spar, a second spar and a third spar;

the first spar and the second spar lie along a reference plane; and the third spar is angularly offset from the reference plane.

19. A lubrication system for an attritable engine, the lubrication system comprising:

a bearing chamber;

a passage extending from a fluid filtering inlet to a fluid filtering outlet, the fluid filtering inlet configured to receive a fluid, and the fluid filtering outlet located downstream of the fluid filtering inlet and configured to deliver the fluid to the bearing chamber;

a three dimensional lattice configured to filter the fluid, the three dimensional lattice arranged fluidly in line between the fluid filtering inlet and the fluid filtering outlet, the three dimensional lattice comprising a repeating pattern of a plurality of spar assemblies, each of the plurality of spar assemblies comprising a plurality of spars sized and oriented to filter particulates in the fluid passing through the lattice from the fluid filtering inlet to the fluid filtering outlet, the plurality of spars in a first of the plurality of spar assemblies radiating out from a common point and comprising a first spar, a second spar and a third spar, the first spar and the second spar lying along a reference plane, and the third spar angularly offset from the reference plane; and a wall extending across the passage between an upstream portion of the passage and a downstream portion of the passage, a metering port extending through the wall and fluidly coupling the upstream portion of the passage and the downstream portion of the passage, the metering port configured to meter the fluid, and the metering port disposed downstream of the three dimensional lattice and upstream of the fluid filtering outlet;

the three dimensional lattice disposed within the upstream portion of the passage, and the downstream portion of the passage extending from the wall to the fluid filtering outlet.

20. The lubrication system of claim 19, wherein the wall is disposed adjacent the three dimensional lattice and intermediately located along the passage.

\* \* \* \* \*